Sept. 9, 1941.  F. JOHNSON  2,255,063
STEERING STRUCTURE
Original Filed July 8, 1940
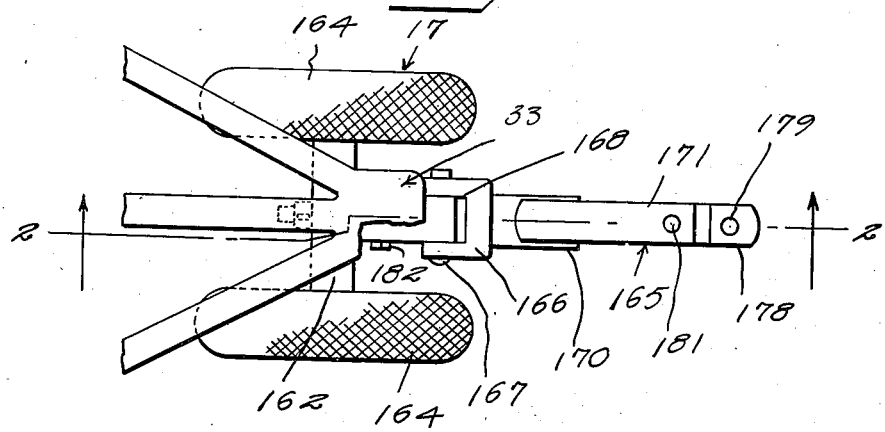
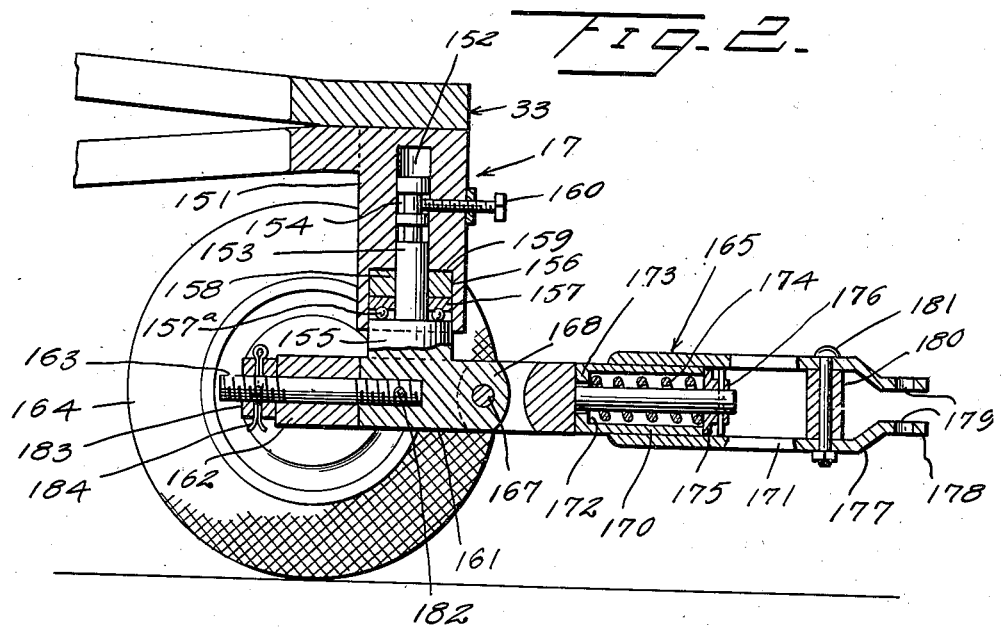
Inventor
Fritz Johnson
By Kimmel & Crowell
Attorneys Patented Sept. 9, 1941

2,255,063

UNITED STATES PATENT OFFICE 2,255,063

STEERING STRUCTURE

Fritz Johnson, Burley, Idaho

Original application July 8, 1940, Serial No. 344,428. Divided and this application January 15, 1941, Serial No. 374,567

4 Claims. (Cl. 280—109)

This invention relates to steering devices and is a division of my copending application, Serial Number 344,428, filed July 8, 1940.

An object of this invention is to provide a steering device in the form of a dolly for use at the front end of an earth surfacing or working machine.

Another object of this invention is to provide a steering device of this kind which is swivelly mounted on the front end of an implement frame and which is so constructed that the height of the forward end of the frame may be adjusted to the desired degree, the device including an improved spindle and mounting means therefor for accomplishing adjustment of the frame.

A further object of this invention is to provide an improved front wheel structure for an earth working implement which is simple in construction so that it may easily be disconnected from the implement.

To the foregoing objects and to others which may hereinafter appear, the invention consists of the novel construction, combination and arrangement of parts as will be more specifically referred to and illustrated in the accompanying drawing wherein are shown embodiments of the invention, but it is to be understood that changes, variations and modifications may be resorted to which fall within the scope of the invention as claimed.

In the drawing:

Figure 1 is a top plan of a steering structure constructed according to an embodiment of this invention mounted in the forward end of an earth working implement, the implement frame structure being fragmentarily shown.

Figure 2 is an enlarged longitudinal section taken on the line 2—2 of Figure 1.

Referring to the drawing, the numeral 17 designates generally a truck structure or dolly which comprises a depending spindle housing 151 which is secured to a head 33 forming the forward end of an earth working implement such as is disclosed in my copending application. The housing 151 is formed axially thereof with a spindle socket or bore 152 which opens through the lower portion of the housing 151. A spindle 153 is adapted to rotatably engage in the socket 152 and the spindle 153 is formed with a pair of peripheral grooves 154 adjacent the upper end thereof.

The spindle 153 has formed on the lower end thereof an enlarged annular head 155 comprising one portion of an anti-friction bearing race which is adapted to rotatably engage in an enlarged bore 156 formed in the lower end of the housing 151. The bore 156 is coaxial with the spindle bore 152. A second annular anti-friction bearing race 157 rotatably engages in the bore 156 and about the spindle 153. Anti-friction balls 157a are interposed between the two races 155 and 157. An annular shim 158 engages loosely about the spindle 153 and at its lower end engages against the upper side of the race 157. The upper end of the shim 158 engages against a shoulder 159 formed by the bearing bore 156 at its upper end. The spindle 153 is rotatably or swivelly retained in the bore 152 by means of a retaining bolt 160 which is threaded through the spindle housing 151 and engages in a selected one of the grooves 154.

The upward thrust of the spindle 153 due to the weight of the forward end of the implement, is borne by the anti-friction bearing structure including the combined spindle head and race 155, the annular race 157 and the bearing balls 157a. The retaining bolt 160 provides a means whereby the spindle 153 is held from downward movement in the bore 152, but the bolt 160 does not bear against the sides of a selected groove 154 in such a manner as to take up any upward thrust of the spindle 153. In this manner, the retaining bolt 160 will not be unduly worn or cut off by excessive weight on the forward end of the implement, the bolt 160 acting only to prevent downward movement of the spindle 153 in the bore 152.

By providing the shim 158, the spindle 153 may be adjusted lengthwise of the housing 151. In other words, with the shim 158 in the bore 156, the head 155 of the spindle will be in an extended position and the retaining bolt will be loosely engaged in the uppermost of the grooves 154. In the event it is desired to lower the forward end of the implement, the shim 158 may be removed and with the shim 158 removed, the spindle 153 will move upwardly in the bore 152 and the retaining bolt 160 will engage in the lowermost of the grooves 154. It will, of course, be understood that if desired, one or more shims 158 may be provided, the number of shims depending on the length of the bore 156 and where more than one shim is provided the spindle 153 may be provided with additional retaining bolt receiving grooves 154.

The head 155 of the spindle 153 is fixed upon the inner end of a forwardly directed spindle support 161. Positioned against the inner end of the support 161 is a pivotal axle body 162 mounted on a pivot 163 having a portion thereof threaded into the rear end of the support 161 and locked by a set screw 182. A pair of truck wheels 164 are rotatably carried by the axle body 162 carried by support 161. The pivot 163 is arranged at the transverse center of and extends rearwardly from the axle body 162. The axle body 162 is pivotally held on the shaft or pivot 163 by a nut 183 on the rear end of pivot 163 and which is locked in adjusted position by a cotter pin 184.

A hitch device generally designated as 165 is secured to the forward portion of support 161 and includes a bifurcated member or clevis 166 which is rockably mounted on a pin or shaft 167 engaging through a forwardly projecting ear 168 carried by the forward side of the support 161. A shaft or stem 169 is carried by the clevis 166 and slidably engages in a housing 170 which is fixed between a pair of draft arms 171. The housing 170 is formed with a rear wall 172 having an opening 173 through which the stem or shaft 169 slidably engages. A spring 174 is disposed about the shaft or stem 169 within the housing 170 and one end of the spring 174 bears against the rear wall 172 of the housing 170 and the opposite or front end of the spring 174 bears against a washer 175 which is mounted on the stem or shaft 169 and held by a retaining pin 176. The draft arms 171 are disposed in parallel relation and extend forwardly of the housing 170. The arms 171 are each formed adjacent the forward ends thereof with an obtusely bent extension 177 terminating in a horizontal ear 178 which is formed with an opening 179.

The two ears 178 are disposed in parallel relation and a securing member in the form of a pin or bolt is adapted to engage through the aligned opening 179 and also through a draft ear or lug which is carried by the rear of the tractor structure. A spacing block 180 is interposed between the forward end portion of the draft arms 171 and is secured therebetween by means of a bolt or fastening member 181. The block or spacing member 180 provides a means whereby the two arms 171 will be held in parallel relation and prevented from bending from the pull exerted on the draft device by the tractor.

In the use of this steering or dolly structure, the forward end of the implement is provided with the spindle housing which may be welded or otherwise fixedly secured in a depending relation to the forward end of the implement frame. The spindle 153 is vertically adjusted in the socket 152 by means of the shim 158 and is locked in its adjusted position by means of the retaining bolt 160. The forward pull on the support 161 is cushioned by means of the hitch device 165, this hitch device being rockably secured at its rear end to the axle body member 161. The dolly structure is adapted to freely swivel within the spindle housing 151 and is prevented from endwise movement in a downward direction by means of the retaining bolt 160.

The dolly structure hereinbefore described has been designed for use with an earth working or surfacing implement such as is disclosed in my copending application hereinbefore mentioned, but it will be understood that this dolly structure may also have other uses in that it may be used with other earth working implements and with a dolly structure of this kind, the forward end of the implement frame may be adjusted to the desired height so as to obtain the desired angle on the tool which is carried by the implement frame.

What I claim is:

1. In an earth working implement having a mobile frame; the combination of a vertically disposed element fixed at its upper end to the forward end of said frame formed with a vertical bore closed at its top, said bore opening through the lower end of said element and having its lower portion of greater diameter and of less length than its upper portion, a spindle rotatable in said bore and having an enlarged circular head at its lower end arranged in and depending from the said lower portion, anti-friction bearing means for the spindle correlated with said head and confined in the said lower portion, a support fixed to the bottom of and extended forwardly from said head, a pivotally supported axle body disposed in transverse relation with respect to and connected with the rear end of said support, means mounted in said element and loosely engaging in said spindle to arrest downward movement of the latter, an annular shim about said spindle and seated on said bearing means, and a hitch device pivotally connected to said support forwardly of said head.

2. In an earth working implement having a mobile frame; the combination of a vertically disposed element fixed at its upper end to the forward end of said frame formed with a vertical bore closed at its top, said bore opening through the lower end of said element and having its lower portion of greater diameter and of less length than its upper portion, a spindle rotatable in said bore and having an enlarged circular head at its lower end arranged in and depending from the said lower portion, anti-friction bearing means for the spindle correlated with said head and confined in the said lower portion, a support fixed to the bottom of and extended forwardly from said head, a pivot bolt engaging in and extended rearwardly from the rear end of said support, an axle body pivotally mounted intermediate its ends upon said bolt and disposed in transverse relation with respect to said rear end, means for maintaining said axle body on the bolt, means connected to said element and engaging in the spindle for arresting vertical movement of the latter, and a hitch device including a yoke-shaped rear end pivotally connected to said support forwardly of said head.

3. In an earth working implement having a mobile frame; the combination of a vertically disposed element fixed at its upper end to the forward end of said frame formed with a vertical bore closed at its top, said bore opening through the lower end of said element and having its lower portion of greater diameter and of less length than its upper portion, a spindle rotatable in said bore and having an enlarged circular head at its lower end arranged in and depending from the said lower portion, anti-friction bearing means for the spindle correlated with said head and confined in the said lower portion, a support fixed to the bottom of and extended forwardly from said head, a pivot bolt engaging in and extended rearwardly from the rear end of said support, an axle body pivotally mounted intermediate its ends upon said bolt and disposed in transverse relation with respect to said rear end, means for maintaining said axle body on the bolt, means connected to said element and engaging in the spindle for arresting vertical movement of the latter, a hitch device including a yoke-shaped rear end pivotally connected to said support forwardly of said head, and means for locking said bolt to said support.

4. In an earth working implement having a mobile frame; the combination of a vertically disposed element fixed at its upper end to the forward end of said frame formed with a vertical bore closed at its top, said bore opening through the lower end of said element and having its lower portion of greater diameter and of less length than its upper portion, a spindle rotatable in said bore and having an enlarged circular head at its lower end arranged in and depending from the said lower portion, anti-friction bearing means for the spindle correlated with said head and confined in the said lower portion, a support fixed to the bottom of and extended forwardly from said head, a pivot bolt engaging in and extended rearwardly from the rear end of said support, an axle body pivotally mounted intermediate its ends upon said bolt and disposed in transverse relation with respect to said rear end, means for maintaining said axle body on the bolt, means connected to said element and engaging in the spindle for arresting vertical movement of the latter, a hitch device including a yoke-shaped rear end pivotally connected to said support forwardly of said head, and an annular shim about said spindle, seated on said bearing means and confined in the said lower portion of said bore.

FRITZ JOHNSON.